United States Patent [19]
Hara et al.

[11] Patent Number: 5,687,824
[45] Date of Patent: Nov. 18, 1997

[54] MULTI-PLATE FRICTIONAL CLUTCH STRUCTURE

[75] Inventors: Tomoyuki Hara, Isehara; Toshiharu Takasaki, Sagamihara, both of Japan

[73] Assignee: Nissan Motor Co., Ltd., Yokohama, Japan

[21] Appl. No.: 530,858

[22] Filed: Sep. 20, 1995

[30] Foreign Application Priority Data

Sep. 21, 1994 [JP] Japan .................. 6-226466

[51] Int. Cl.$^6$ .................................. F16D 25/08
[52] U.S. Cl. .................. 192/85 CA; 192/85 R; 192/58.41; 475/86
[58] Field of Search .............. 192/85 CA, 85 R, 192/85 AA, 58.41, 59; 475/86

[56] References Cited

U.S. PATENT DOCUMENTS

| | | | |
|---|---|---|---|
| 3,038,575 | 6/1962 | Hansen | 192/85 CA |
| 4,226,319 | 10/1980 | Euler et al. | 192/85 CA |
| 4,811,628 | 3/1989 | Winkam et al. | 192/85 CA X |
| 5,234,091 | 8/1993 | Kobayashi et al. | 192/85 CA |

FOREIGN PATENT DOCUMENTS 1-204826  8/1989  Japan.

*Primary Examiner*—Andrea L. Pitts
*Attorney, Agent, or Firm*—Foley & Lardner

[57] ABSTRACT

A multi-plate type frictional clutch for a four-wheel drive vehicle is provided in a transfer unit for effecting variable driving force distribution in a 4WD vehicle. An inner wall of a transfer casing includes rotation restriction members so as to restrict rotational movement according to axial movement of a clutch piston disposed within the transfer casing. A cylinder chamber is defined between the rotation restriction members and the clutch piston. Also, the clutch piston is engageable with a rotational portion of a multi-plate type friction clutch via a thrust shaft receiving member disposed between the piston and the rotational portion of the multi-plate clutch. Further, the rotation restriction arrangement includes a casing boss and a piston boss engageable with an input shaft of the transfer unit according to rotational movement thereof. The engagement strength of the casing boss and the piston boss are set to be substantially low. Accordingly, highly accurate control of distribution of driving force variation in a 4WD vehicle may be assured.

4 Claims, 11 Drawing Sheets

MULTI-PLATE FRICTIONAL CLUTCH STRUCTURE

FIELD OF THE INVENTION

The present invention is drawn to a multi-plate type frictional clutch structure. Particularly, the present invention relates to a multi-plate clutch for an automotive vehicle which is adapted to operational environments such as driving conditions associated with 4WD vehicles and the like. It will be noted that new U.S. patent application Ser. Nos. 08/320,544, 08/319,047, 08/320,543, and 08/341,155 by the present applicant, are related to the subject matter of the present application and incorporated herein by reference.

DESCRIPTION OF THE RELATED ART

Generally, multi-plate type friction clutches are well known for use in 4WD vehicles. One such clutch is disclosed in Japanese Patent Application (First Publication) 1-204826, which discloses background related to the present application.

Hereinbelow, operation of such a conventional multi-plate type friction clutch, under conditions in which different driving force outputs generated at front and rear wheels of a 4WD (four-wheel drive) vehicle are output by a vehicular transmission, will be discussed with reference to FIG. 13.

As may be seen in the drawing, driving force from rear vehicular wheels is transmitted to an input shaft 2 of a driving force transfer unit, disposed at a substantially center portion thereof. A multi-plate type friction clutch (hereinbelow: clutch) 1 is disposed proximate the input shaft 2 for distribution of driving force variation generated at front vehicular wheels of the 4WD vehicle. A clutch drum 1a of the friction clutch 1 is attached to the input shaft 2 via a spline, or the like. The clutch drum 1a is provided with a plurality of friction plates 1b which are engageable according to rotational movement thereof. Further, a clutch hub 1c is disposed on an outer surface of the input shaft 2 so as to rotate therewith. The clutch hub is provided with a plurality of clutch (drums) 1d which are interleaved with the friction plates 1b, the clutch drums 1d also being engageable according to rotational movement thereof.

Pictured at the upper right of the friction clutch 1 in FIG. 13, a clutch piston 1e is disposed between the friction plates 1b and the clutch drum 1a. Further, a cylinder chamber 1f is defined in the inner wall of the clutch drum 1a, so as to be disposed between the clutch piston 1e and the clutch drum 1a. The clutch piston is mounted via a return spring 1g biased in a direction opposing that generated within the cylinder chamber 1f.

In addition, a transfer casing 3 is provided with an input port 4 positioned so as to allow working fluid pressure P to be transferred from a fluid supply reservoir (not shown) to the cylinder chamber 1f via fluid supply circuits 5a, 5b. As also seen in the drawing, a seal 6 is disposed between the fluid supply circuit 5a of the transfer casing 3 and the fluid supply circuit 5b associated with the clutch drum 1a so as to prevent pressure loss, fluid leakage, and the like.

However according to a multi-plate friction clutch structure as described above, a separate fluid supply circuit 5b is required for providing working fluid pressure P to the clutch drum 1a. Further, it is necessary to provide a seal 6 between the transfer fluid supply circuit 5a and the clutch drum fluid supply circuit 5b. According to this, a structure of the fluid circuit becomes complex and further, the seal 6 is subject to frictional wear, etc., degrading overall operation of the fluid circuit and degrading the overall performance thereof. As a result, reliable provision of a necessary working fluid pressure P to the cylinder chamber 1f, for effecting operation of the multi-plate friction clutch 1, cannot be assured. Under such a condition, accurate distribution of driving force variation by the transfer unit cannot be maintained.

Thus it has been required to provide a multi-plate type friction clutch for 4WD vehicles in which the above-mentioned drawbacks can be removed, and in which highly accurate distribution of driving force variation can be reliably maintained. Further, a multi-plate type friction clutch for 4WD vehicles requiring less maintenance and having a longer working life is preferably required.

SUMMARY OF THE INVENTION

Thus it is an object of the present invention to overcome the drawbacks of the prior art.

It is another object of the invention to provide a low maintenance multi-plate type frictional clutch adapted for 4WD vehicles in which highly accurate distribution of driving force variation can be reliably maintained.

It is a still further object of the invention to provide a low maintenance multi-plate type frictional clutch adapted for 4WD vehicles having a substantially long working life.

A multi-plate type frictional clutch for a four-wheel drive vehicle is provided in a transfer unit for effecting variable driving force distribution in a 4WD vehicle. An inner wall of a transfer casing includes rotation restriction members so as to restrict rotational movement according to axial movement of a clutch piston disposed within the transfer casing. A cylinder chamber is defined between the rotation restriction members and the clutch piston. Also, the clutch piston is engageable with a rotational portion of a multi-plate type friction clutch via a thrust shaft receiving member disposed between the piston and the rotational portion of the multi-plate clutch. Further, the rotation restriction arrangement includes a casing boss and a piston boss engageable with an input shaft of the transfer unit according to rotational movement thereof. The engagement strength of the casing boss and the piston boss are set to be substantially low. Accordingly, highly accurate control of distribution of driving force variation in a 4WD vehicle may be assured.

According to one aspect of the present invention, there is provided a multi-plate frictional clutch structure for a four wheel drive vehicle in which a rotational multi-plate clutch assembly having a predetermined engaging strength and torque distribution ratio characteristics of an output shaft thereof, wherein a working fluid supply from a fluid chamber to a clutch piston, dependent on a rotational speed of corresponding road wheels of the vehicle, is active to move the clutch piston in an axial direction, comprising: a casing having an interior wall portion including a rotation restriction portion active to restrict rotational movement according to axial movement of the clutch piston in engaging and disengaging directions; a cylinder chamber interposed between the inner wall of the casing and the clutch piston; and the multi-plate clutch assembly being disposed in a thrust direction of the clutch piston so as to establish engagement therewith according to the axial movement of the clutch piston.

According to another aspect of the invention, there is provided a multi-plate type frictional clutch comprising: a working fluid supply from a fluid chamber to a clutch piston of the frictional clutch, a pressure of the working fluid being dependent on a rotational speed of corresponding road wheels of the vehicle to move the clutch piston in an axial direction; a casing having an interior wall portion including a rotation restriction portion active to restrict rotational movement according to axial movement of the clutch piston in engaging and disengaging directions; a cylinder chamber interposed between the inner wall of the casing and the clutch piston; and engaging means of the frictional clutch disposed in a thrust direction of the clutch piston so as to establish engagement with the rotation restricting portion according to the axial movement of the clutch piston.

DESCRIPTION OF THE PREFERRED EMBODIMENT

A preferred embodiment according to the present invention will be explained hereinbelow in detail with reference to the drawings.

Figure 1:
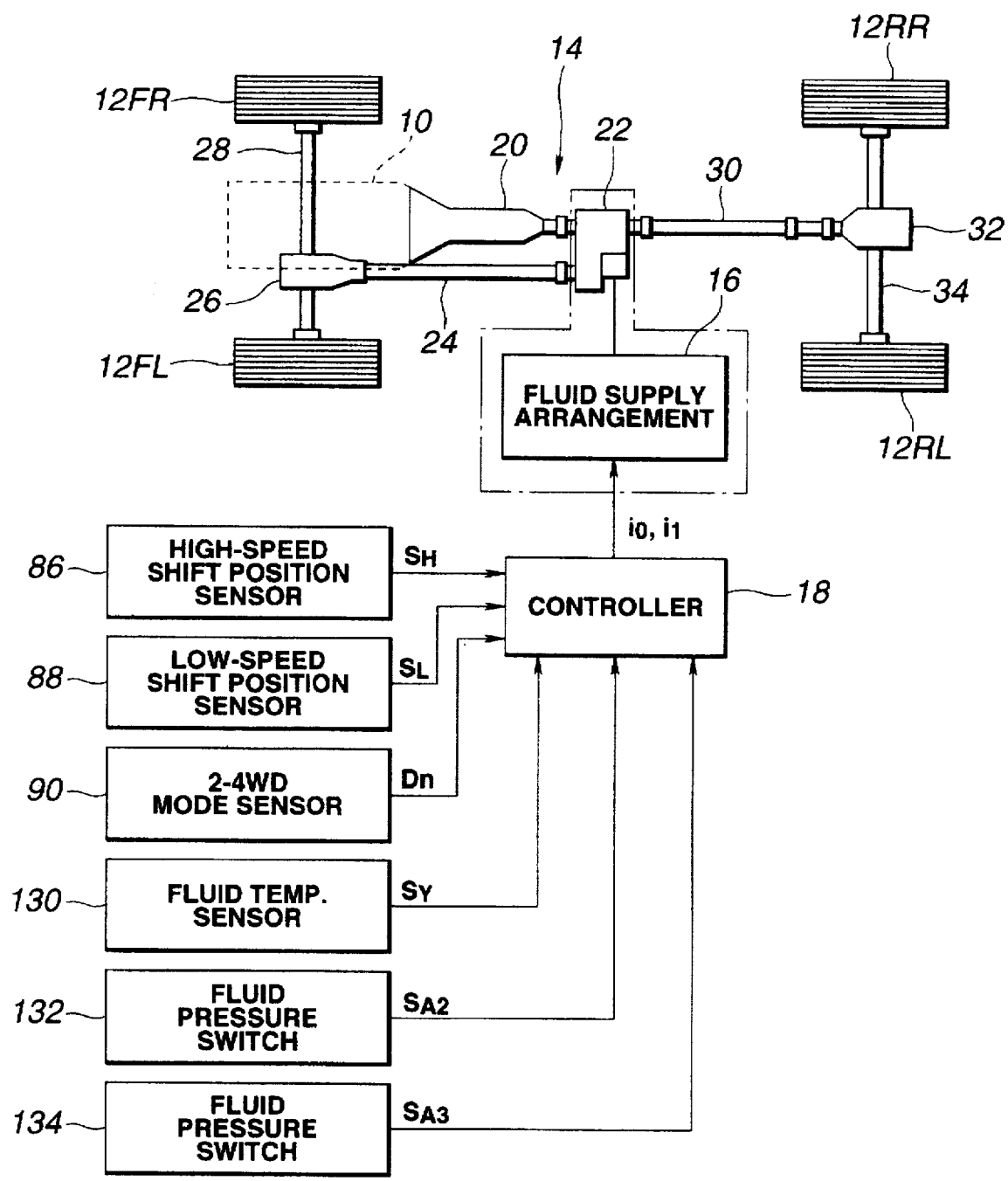
FIG. 1 is a block diagram for explaining driving force distribution operation for a 4WD vehicle utilizing a multi-plate type frictional clutch according to the invention.

Referring to FIG. 1, there is shown an explanatory block diagram of variable driving force distribution ratio control in a so-called 'part time' four-wheel drive (4WD) vehicle utilizing an FR (front engine/rear drive) type arrangement.

The dotted rectangle of FIG. 1 shows the driving power source, engine 10 and, as also seen in the drawing, the vehicular road wheels are numbered from front left to rear right as 12FL~12RR. The driving force from the vehicle engine 10 is transferred according to a variable distribution ratio by a variable distribution driving force transmission portion 14 (hereinbelow: transmission portion 14). Control of driving force distribution by the transmission portion 14 is effected by a fluid circuit arrangement 16, and a controller 18 of the vehicle (not shown).

At the transmission portion 14, driving force from the engine is output to a selectable gear ratio type automotive transmission 20. The driving force output from the automotive transmission 20 is divided for distribution to the front road wheels 12FL, 12FR and the rear road wheels (main drive wheels) 12RL, 12RR via a transfer unit 22. As may be seen, the transfer unit 22 outputs the divided driving force to the road wheels 12FL~12RR via a front wheel output shaft 24 connected to a front differential gear 26 which drives a front drive shaft 28 and a propeller shaft (viz; rear wheel output shaft) 30 to a rear differential gear 32 driving a rear drive shaft 34.

Figure 2:
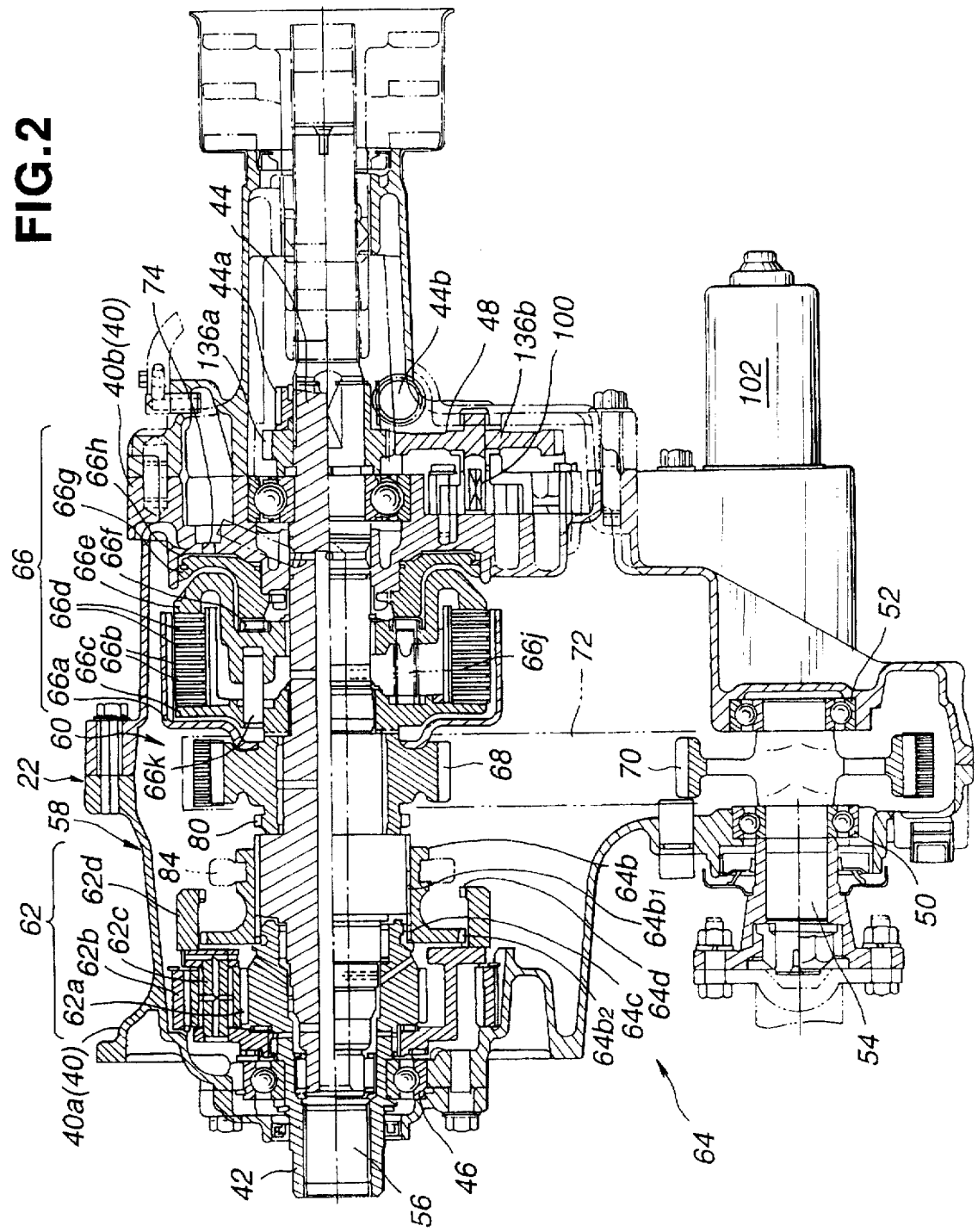
FIG. 2 shows a cross-sectional view of the transfer unit of the 4WD vehicle of FIG. 1 including the multi-plate type friction clutch according to a preferred embodiment of the invention.

Referring now to FIG. 2, a cross-sectional view of the transfer unit 22 is shown. A transfer casing 40 houses an input shaft 42 and a first output shaft 44 which are rotatably mounted therein. The input shaft 42 is rotatably supported by an input shaft bearing 46 provided on a front casing 40a, while the first output shaft is received and supported so as to be reversibly rotatable by a first output shaft bearing 48 at a rear casing 40b of the transfer casing 40. Further, at a lower portion of the casing 40 at front and rear casings 40a, 40b respectively, bearings 50, 52 are provided rotatably mounting a second output shaft 54. It will be noted that the input shaft 42 is connected with an output shaft of the automotive transmission 20, while the first output shaft is connected to the rear wheel output shaft 30 and the second output shaft is connected to the front wheel output shaft 24.

Further, a sub-transmission portion 58 and a 2–4 wheel drive switching arrangement 60 are associated with the input shaft 42 and the first output shaft 44.

The sub-transmission portion 58 includes a planetary gear 62 coaxially arranged with the input and first output shafts 42, 44 and a switchable high and low speed clutch arrangement 64.

The planetary gear 62 includes a sun gear 62a provided on an outer circumference of the input shaft 42, an internal gear 62b attached to an inner side of the front casing 40a and a pinion gear 62c for effecting engagement of the sun and internal gears 62a, 62b. The pinion gear 62c is rotatably mounted on a pinion carrier 62d.

The high/.low speed switching arrangement 64 is disposed at an outer circumference of the first output shaft 44 and includes a plurality of key grooves and inner teeth 64b1 and outer circumferential teeth 64b2 and is connected to a spline for allowing sliding movement in the axial direction of the first output shaft 44. Thus, when a shift sleeve 64b may engage the inner teeth 64b1 with a high speed shift gear 64c or the outer teeth 64b2 with the low speed shift gear 64d of the pinion carrier 62d.

Figure 3:
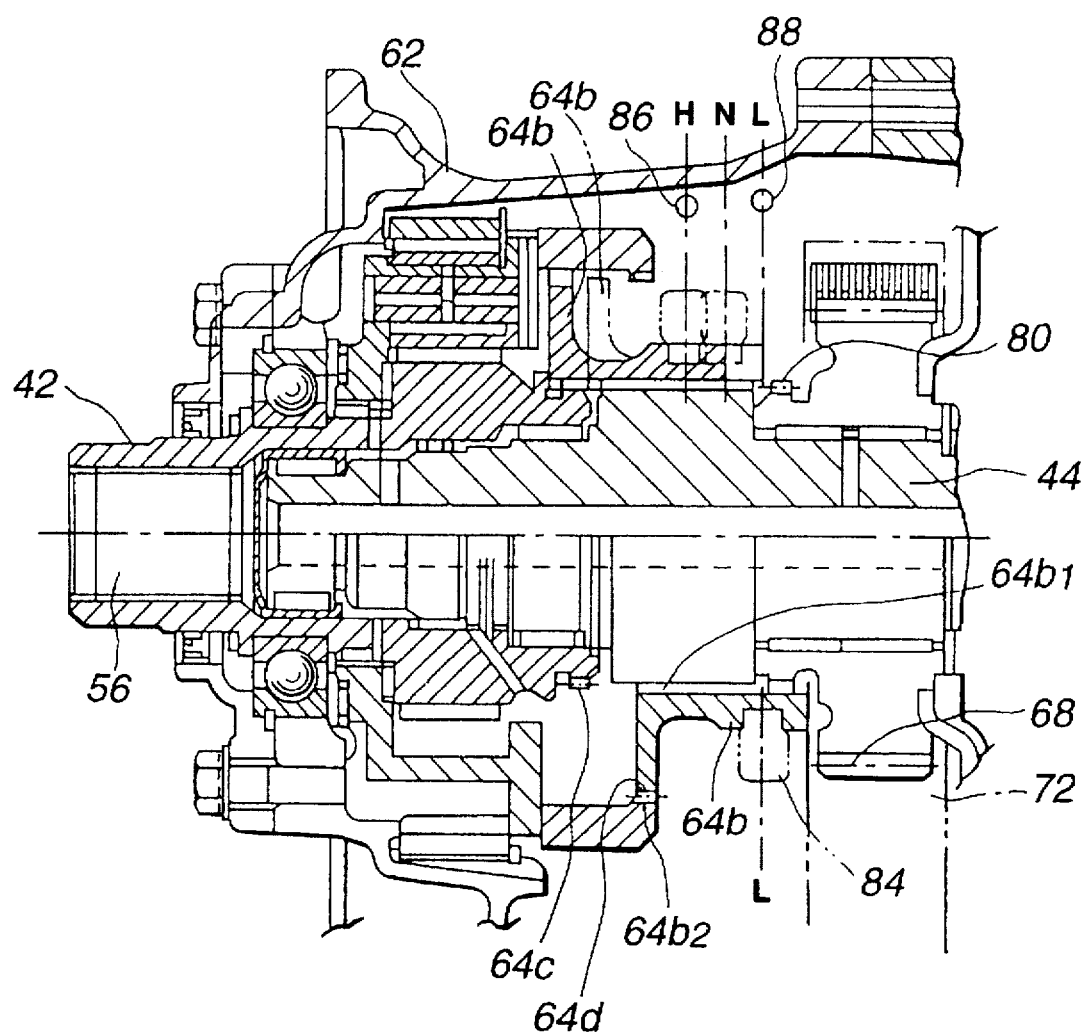
FIG. 3 shows an enlarged cross-sectional view of a transmission structure of a transfer unit according to the invention for explaining a shift sleeve thrust operation thereof.

Referring now to FIG. 3, dot-dash lines indicate a position of the shift sleeve for effecting neutral as well as high and low speed operation. That is, according to a signal H output from the controller, the shift sleeve is urged to sliding movement which terminates at a H position and in response to an L signal, slides to an L position.

The 2–4 wheel drive switching arrangement includes a variable front wheel driving force distribution ratio multi-plate friction clutch 66 (hereinbelow: friction clutch 66), a first sprocket 68 rotatable with the first output shaft 44, a second sprocket 70 rotatable with the second output shaft 54, and a chain 72 for effecting driving connection between the first and second spockets 68, 70.

Figure 4:
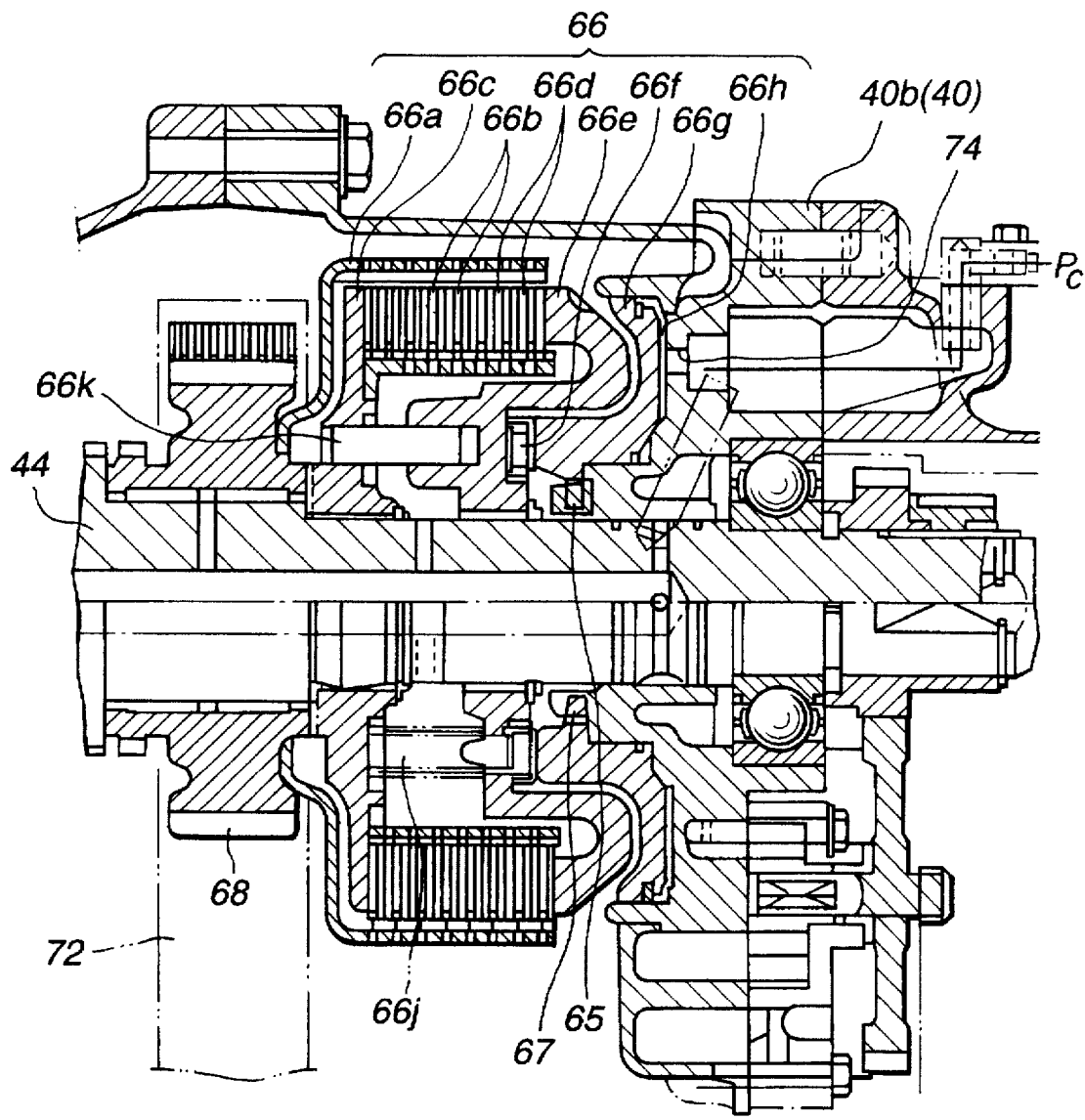
FIG. 4 shows an enlarged cross-sectional view of a multi-plate type friction clutch according to the preferred embodiment.

FIG. 4 shows a detailed cross-section of the friction clutch 66. As may be seen in the drawing, the first sprocket 68 is connected to a clutch drum 66a which is splined to a plurality of friction plates 66b. The output shaft 44 is splined to a clutch hub 66c which is integrally connected to a plurality of friction disks 66d which are interleaved with the friction plates 66b. Further, when according to axial movement of the clutch drum 66a the friction plates and disks 66b and 66d are engaged, a rotation member 66e is driven in co-rotation with the clutch hub 66c. A connecting pin 66k engages between the rotational member 66e and the clutch hub 66c while a clutch piston 66g, adjacent an inner wall of the rear casing 40b, is axially movable via an axial thrust receiving member 66h disposed between the rotational member 66e and the clutch piston 66g. Further, a cylinder chamber 66h is defined between the clutch piston 66g and the inner wall of the rear casing 40b. Working fluid is supplied from a fluid supply source (not shown) to the cylinder chamber via a port 74 formed in the rear casing. The clutch piston is mounted via a return spring 66j biasing the piston in the direction of the rear casing.

According to this, according to provision of a clutch pressure Pc to the cylinder chamber 66f, the piston 66g is moved in the left direction of FIG. 4, the axial movement is transmitted to the rotational member 66e via the thrust receiving member 66f to cause the friction disks 66d to frictionally engage the friction plates 66b. In response to the engaging force of the clutch 66, a predetermined torque distribution ratio is established between the first and second output shafts 44 and 54 via the first and second sprockets 68 and 70 and the drive chain 72.

When the fluid pressure in the cylinder chamber falls below the clutch pressure Pc, the piston 66g is moved in the opposite direction and frictional engagement of the clutch is terminated according to disengagement of the frictional plates and disks 66b, 66d, and transmission of rotational driving force from the first output shaft 44 to the second output shaft 54 via the drive chain 72 is terminated.

Figure 5:
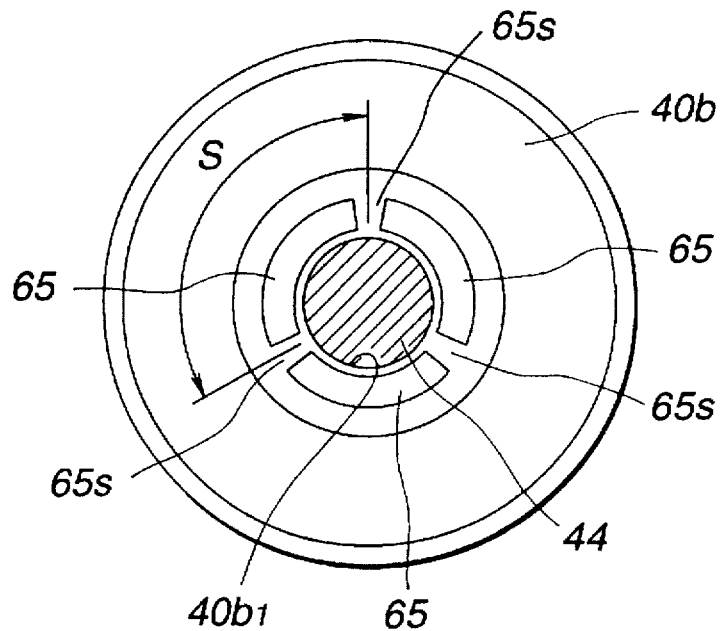
FIG. 5 is an axial cross-sectional view of a transfer casing.
Figure 6:
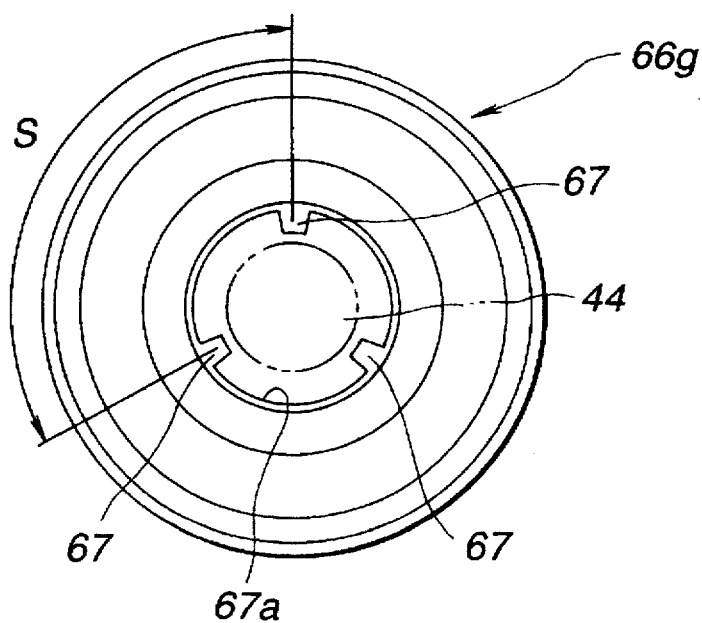
FIG. 6 is an axial cross-sectional view of a clutch piston.

Referring now to FIG. 5, an axial side view of the inner wall of the rear casing 40b of the transfer casing 40 is shown. As may be appreciated, around an opening 40b1 through which the first output shaft 44 is inserted, three apertures 65s are defined through a casing boss 65 at a pitch S of 120°. The pitch S is defined between any two of the casing boss apertures 65s. On the other hand, FIG. 6 shows an axial side view of the piston 66g. As may be seen, at an inner circumferential portion 67a coaxial with the first output shaft 44, three piston bosses 67 are projected. The pitch S between any two of the piston bosses 67 is also equal to 120°.

According to this, when the piston bosses 67 are inserted into the apertures 65s of the inner wall of the rear casing 40b, rotation of the piston 66g is prevented. As will be noted from FIG. 4, in this non-rotatable condition of the piston 66g, the fluid chamber 66h is yet interposed between the piston 66g and the rear casing 40b.

When a set torque T is produced at the piston 66g, the piston bosses 67 are designed to release the piston 66g to its rotatable state. According to this, a lowest torque transmission ratio equal to the set torque T is established between the first and second output shafts 44, 54.

Also, referring back to FIGS. 2 and 3, a 4WD gear of the 2–4 wheel drive arrangement 60 is provided with a 4WD gear 80 adjacent the sprocket 68. When the shift sleeve 64 is moved axially forward to engage the inner teeth 64b1 of the shift sleeve and the 4WD gear 80, at the L position of FIG. 3, strong driving force transmission between the sprockets 68 and 70 is effected establishing a dog clutch type arrangement.

In addition, as will be seen in FIG. 3, positional sensors 86 and 88 are provided for detecting whether the shift sleeve is positioned at H or L position and for outputting respective signals SH and SL to the controller 18. The shift sleeve is moved via a fork 84 between the L, N, and H positions according to operation of a sub-transmission lever (not shown).

Figure 7:
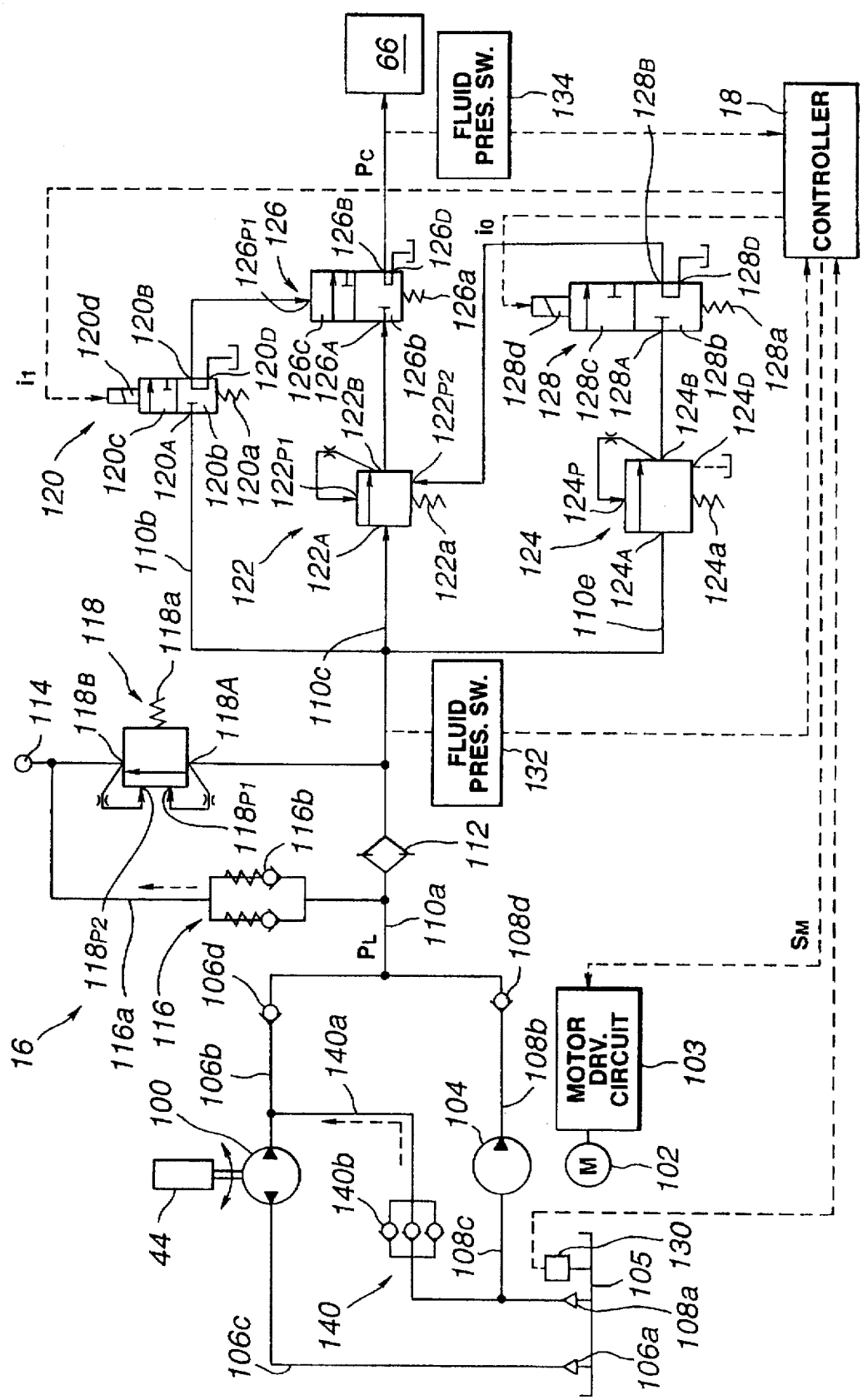
FIG. 7 is a schematic diagram showing the arrangement of a fluid supply circuit according to the invention.

Hereinbelow, operation of the fluid circuit 16 for providing the clutch pressure Pc to the transfer unit 22 via the port 74 will be explained with reference to FIG. 7.

The fluid circuit includes a main pump 100 for providing direct connection for effecting rotational reversal of the first output shaft 44 via a servo motor 102 for obtaining driving force from a sub pump 104. The main and sub pumps 100, 104 receive working fluid from a fluid tank 105 via strainers 106a, 108a respectively. The output working fluid of the pumps 100, 104 are output via pressure relief lines 106b, 108b respectively. The relief lines 106b, 108b are connected to a pressure levelling line connected to an oil element 112. At an upstream side of the oil element 112 (i.e. pumps 100, 104) a lubricating portion slide 114 and a relief circuit 116 are arranged at a different outlet thereof. Downstream of the oil element 112 an oil pressure adjust valve 118 is provided.

From the pressure leveling line 110a, branch lines 110b, 110c, 110d are respectively provided with electromagnetic opening/closing valves 120 communicated with input sides of a clutch pressure adjusting valve 122 and a base pressure valve 124. At the output side of the clutch pressure adjusting valve 122, pilot pressure is provided from the electromagnetic valves 120 to a pilot pressure switching valve 126 for supplying clutch pressure Pc to the transfer unit 22. The output side of the base pressure valve 124 is connected to the input side of a duty control valve 128. Further, a working fluid temperature sensor 130 is provided for detecting a temperature of working fluid in the oil tank 105. Line pressure detecting switches 132, 134 are provided for detecting pressures at the pressure adjusting valve 122 and the pilot pressure switching valve 126 respectively. The detected pressures are output as detect signals to the controller 18.

According to the structure of a 4WD vehicle utilizing the invention, a fluid pressure circuit 16 may normally be provided within the transfer unit 22. Also the working fluid from the oil tank 105, taken in by the main pump 100, effects connection between first and second gears 136a and 134b and the first output shaft 44, as seen in FIG. 2. It will further be noted that a bypass circuit 140 is provided between the output lines 106b, 108b of the main and sub pumps 100, 104. The bypass circuit outlet is inserted into a 3 channel reverse stop valve 140b which is opened in response to a defeat pressure from the output line 106b such that working fluid flow is established in the broken line arrow direction in FIG. 7. When the relief circuit 116 is in a condition where the reverse stop valve 116b is open, fluid flow is established in the direction of the dotted arrow. In the line pressure adjusting valve 118 base pressure is established via an internal pilot pressure and a return spring 118a. The line pressure adjusting valve 118 includes input port 118A connected with the pressure leveling line 110a. The lubricating portion 114, output port 118B, and pilot ports 118P1 and 118P2, which apply first and second control pressures are communicated. The pilot ports 118P1 and 118P2 are applied to the spool of the line pressure adjusting valve 118 which is biased by the return spring 118a. Further, the line pressure adjusting valve 118, via the main pump 100, based on supply pressure PL from the sub pump 104, supplies fluid to an electromagnetic switching valve 120, a clutch pressure adjusting valve 122, and a base pressure valve 124. The base pressure setting side output port 118B, outputs working fluid to return to the lubricating portion 114.

Referring to the drawings, the clutch pressure adjusting valve 122 and the base pressure valve 124 and the electromagnetic duty control valve 128 will be described in detail.

In the clutch pressure adjusting valve 122 according to the present embodiment, a movable portion, such as a spool of the clutch pressure adjusting valve 122 is exposed to pilot pressure opposing the biasing force of a spring or the like. According to the structure of the clutch pressure adjusting valve 122, pressure line 110c is connected to an input port 122a, and the pilot pressure switching valve 126 is connected with an output port 122B. Control pressure variation (i.e between the two preset control pressures) is supplied by an inner supply pilot port 122P1, while a electromagnetic duty control valve 128 supplies pressure to an outer pilot port 122B. From the output port 124B, an internal line pressure variation supply valve 124P, and a drain port 124D are communicated with the spool disposed in the valve housing and biased against return spring 122A. According to the present structure, when the clutch pressure adjusting valve 122 is not supplied with control pressure from the electromagnetic duty control valve 128, the fluid circuit including the input port 122A and the output port 122B is closed such that the first and second control pressures are not provided. On the other hand, when control pressure is supplied from the electromagnetic control valve 128, movement of the spool is controlled such that the output port 122B may be established between first and second clutch control pressures Pc, in response to a pilot control pressure of the clutch pressure adjusting valve 122.

According to the structure of the base pressure valve 124, pressure line 110e and the pilot switching valve 126 are connected via an input port 124A and the electromagnetic duty control valve 128 is connected with an output port 124B. From the output port 124B, an internal line pressure variation (i.e between the two preset control pressures) supply valve 124P, and a drain port 124D are communicated with a spool arrangement or the like disposed in the valve housing and biased against return spring 124a. Pilot pressure at the pilot port 124P is controlled move within the valve housing so as to establish control of base pressure with a control pressure provided by the electromagnetic duty control valve 128.

In addition, the electromagnetic duty control valve 128 according to the embodiment is of a 'three port/two position' type The base pressure valve 124 in connected to the the duty control valve 128 via an input port 128A, and the drain side is connected to a drain port 128P. The outer pilot port 122P2 of the clutch pressure adjusting valve 122 is connected to an output port 128B and the drain port 128D. A return spring 128a is provided and an internal spool of the valve is movable between a normal position 128b communicated with the output port 128B and drain port 128D and an operational position 128c. Further, according to a set duty ratio of a solenoid 128d, the controller 18 supplies an electromagnetic current $i_0$ for controlling movement of the spool responsive to a pilot control pressure output by the clutch pressure adjusting valve 122. At this, control pressure is supplied from the duty control valve for the clutch pressure adjusting valve 122 via the outer pilot port 122P2. The pilot control pressure is responsive to the clutch pressure Pc and engagement strength of the frictional clutch 66 is further responsive thereto for effecting transfer of driving torque.

As for the spring offset type electromagnetic switching valve 120, such a three point/two position type arrangement is utilized in which line pressure is supplied to input port 120A and an outer pilot port 126P1 of the pilot switching valve 126 is associated with an output port 120B and drain port 120D according to a normal position 120c of the valve spool wherein the input port 120A is blocked. In an operational position 120b, the input port 120A and output port 120B are communicated while the drain portion 120D is blocked. Control pressure is received from the outer pilot port 126P1 for establishing the operational position 120c according to operation of solenoid 120d according to a control current $i_1$ from the controller 18. When output of the current $i_1$ becomes OFF, a return spring 120a is active to return the spool to the normal position 120b.

Figure 8:
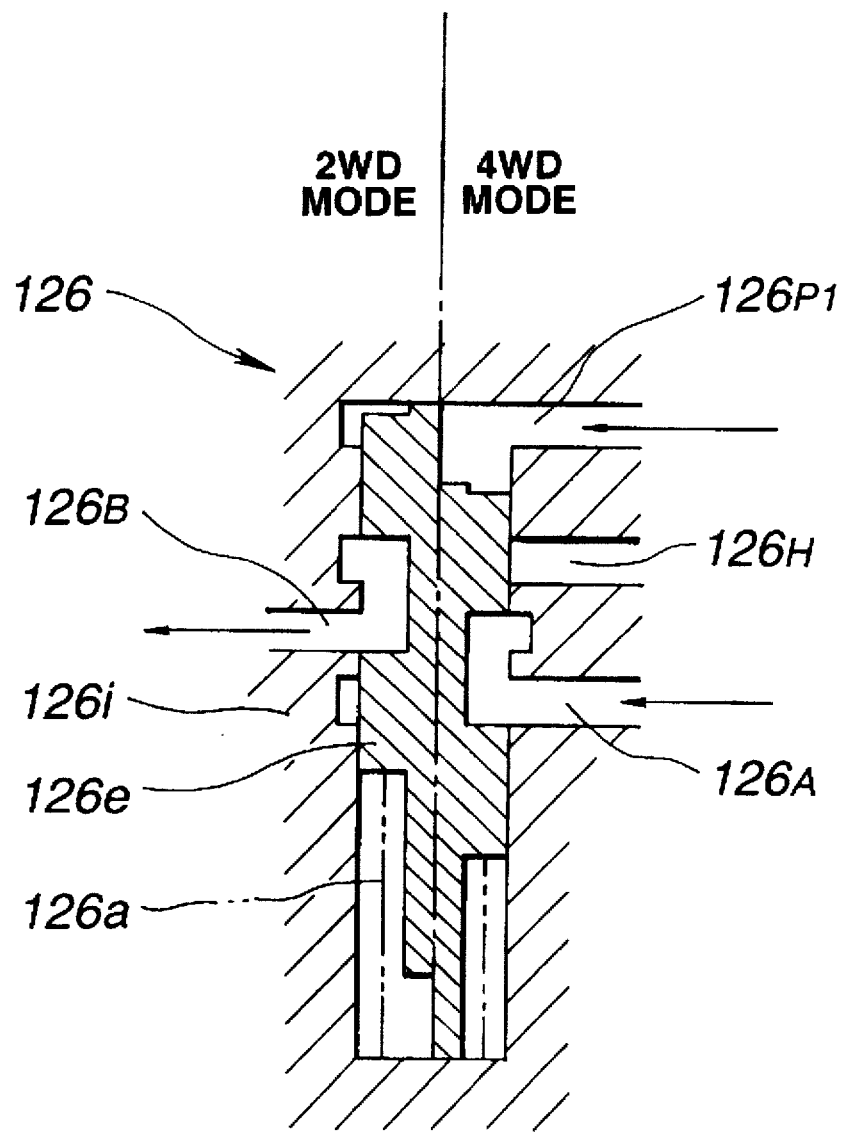
FIG. 8 is a cross-sectional view of a cut-off valve utilized by the fluid supply circuit of FIG. 7.

FIG. 8 shows the arrangement of a spool valve utilized as the pilot switching valve 126. As may be seen, when a second pressure supply input port 126A, second pressure supply output port 126B, a solenoid 120d of the electromagnetic valve 120, a control pressure supply outer portion 126Pi, and a drain portion 126D are present at a tubular valve housing 126i, a spool 126e is moved. At one end of the valve housing 126i, a return spring 126a is disposed.

When pilot control pressure is supplied to the outer pilot port 126P1 from the spool 126e, input and output ports 126A, 126B are intercepted. Output port 126B is connected with drain port 126D and 2WD mode position is established. Further, when the solenoid 120d is turned ON the electromagnetic valve 120 is active to move the spool 126e to establish 4WD mode position.

As may be seen in FIG. 1, the high speed shift position sensor 86, the low speed shift portion sensor 88, and a 2–4 WD mode position sensor 90 output signals to the controller 18 which outputs flow control signals $i_o$, $i_i$ to the fluid circuit 16. According to the present embodiment, the same controller may reliably control fluid pressure in the fluid circuit via a control signal CS2 based on output signals from the oil pressure temperature sensor 130 and the fluid pressure switches 132, 134.

Figure 9:
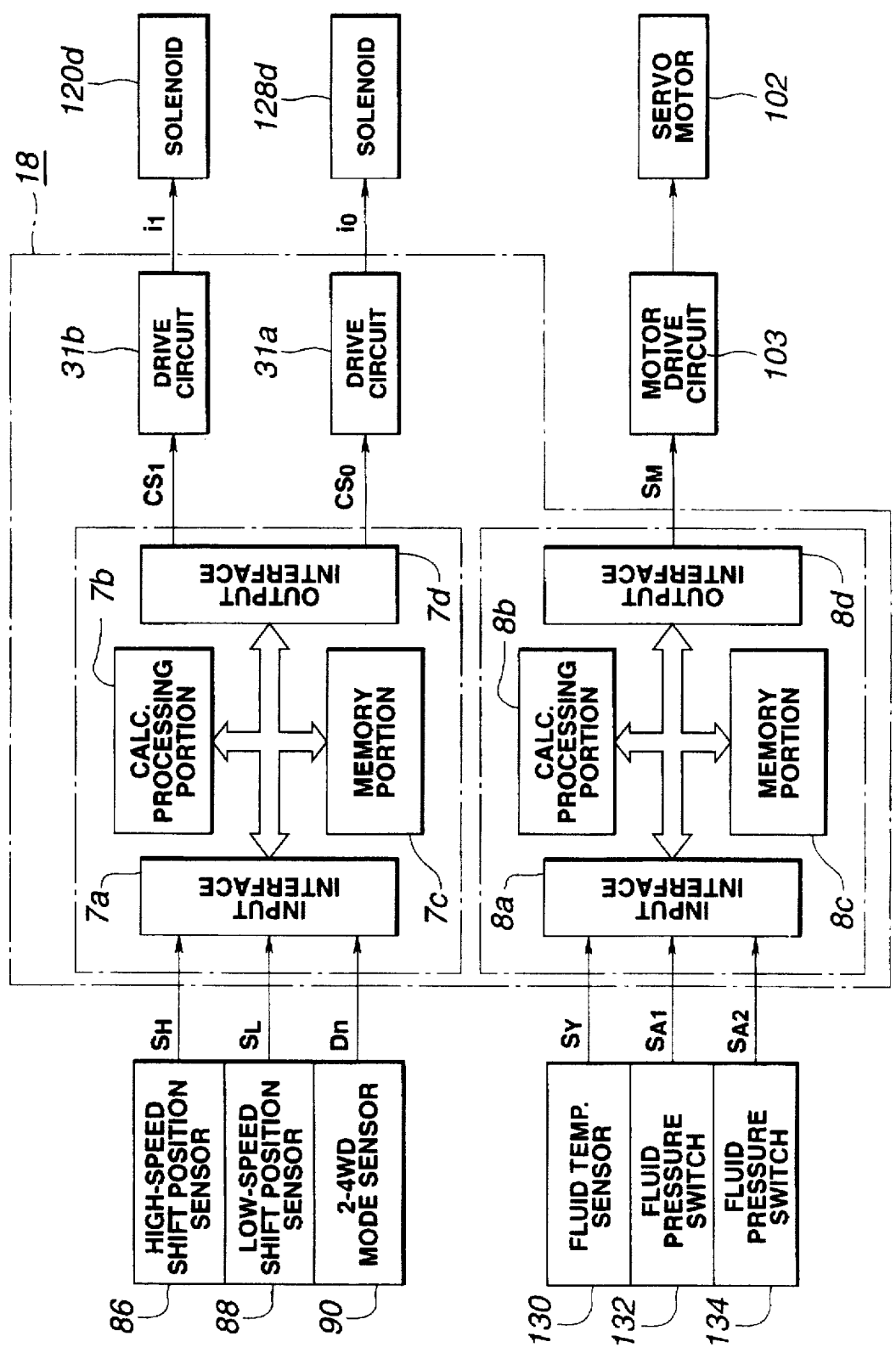
FIG. 9 is a block diagram of a control unit for effecting variable driving force distribution according to the invention.

FIG. 9 shows the components of the controller 18 according to the present embodiment. The controller components include a microcomputer 7 having control circuits 31a and 31b outputting control signals CS0 and CS1 respectively for effecting control of the solenoids 128d and 120d.

As may be seen the controller 18 includes a first input interface 7a of a first microcomputer 7 receiving signals SH, SL, Dn, from the sensors 86, 88, 90 respectively and a second input interface 8a receiving signals SY, SA1, SA2 from the sensors 130, 132, 134. The computers 7 and 8 also respectively include calculation processing portions 7b, 8b and memory devices 7c, 8c such as RAM or ROM devices as well as output interfaces 7d, 8d. The output interface 7d produces signals CS1 and CS0 for input to driving circuits 31b, 31a respectively to produce the flow control signals $i_1$, $i_0$ to solenoids 120d and 128d of the opening/closing electromagnetic valve 120 and the duty control valve 128. It will be appreciated that the input and output interfaces 7a, 8a, 7d, 8d of the microcomputers 7, 8 are arranged with appropriate A/D and D/A conversion means for receiving and outputting sensor input signals, control signals, and the like such that the calculation portions 7c, 8c may suitably utilize analog sensor outputs as required.

Also, the output interface 8d outputs a signal SW to the motor driving circuit 103 for operation of the electric servo motor 102; subject to so called chopper control responsive to the control signal SM for effecting rotational speed control of the motor 103. Thus a desired line pressure of the fluid circuit may be reliably maintained. According to this structure, fine control of fluid pressure characteristics may be achieved. For example, if according to data input to the controller 18 from an external processing means or the like (not shown), if the fluid pressure switch 132 detects a pressure in the pressure leveling line 110a downstream of the oil element which is lower than a predetermined set pressure, according to output pressure from the sub pump 104, the fluid temperature sensor 120 is controlled to output fluid temperature value signal SY. Calculation of the output control signal SM is thus adjusted to effect appropriate motor control for establishing the desired set pressure.

Figure 10:
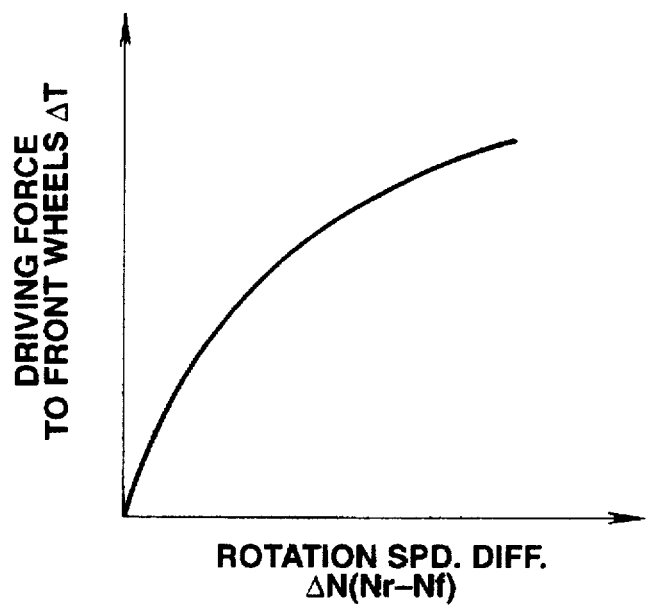
FIG. 10 is a graph showing a relation between front and rear wheel rotational speed difference and front wheel torque transmission.
Figure 11:
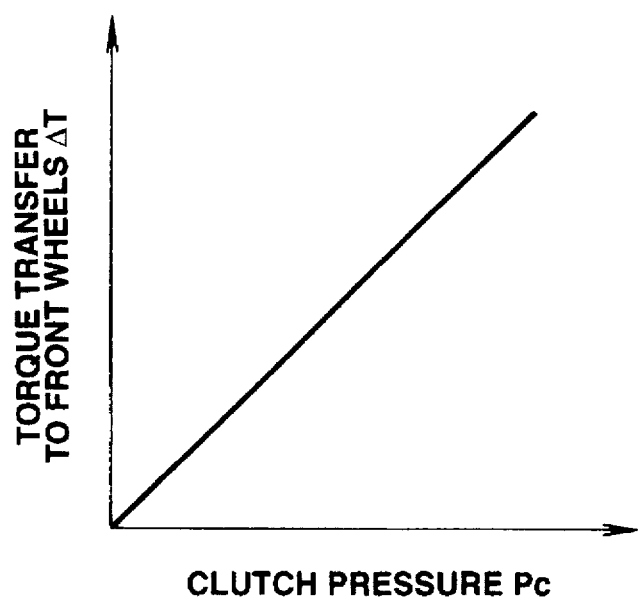
FIG. 11 is a graph showing control response of working fluid pressure in the clutch in relation to front wheel torque transmission.
Figure 12:
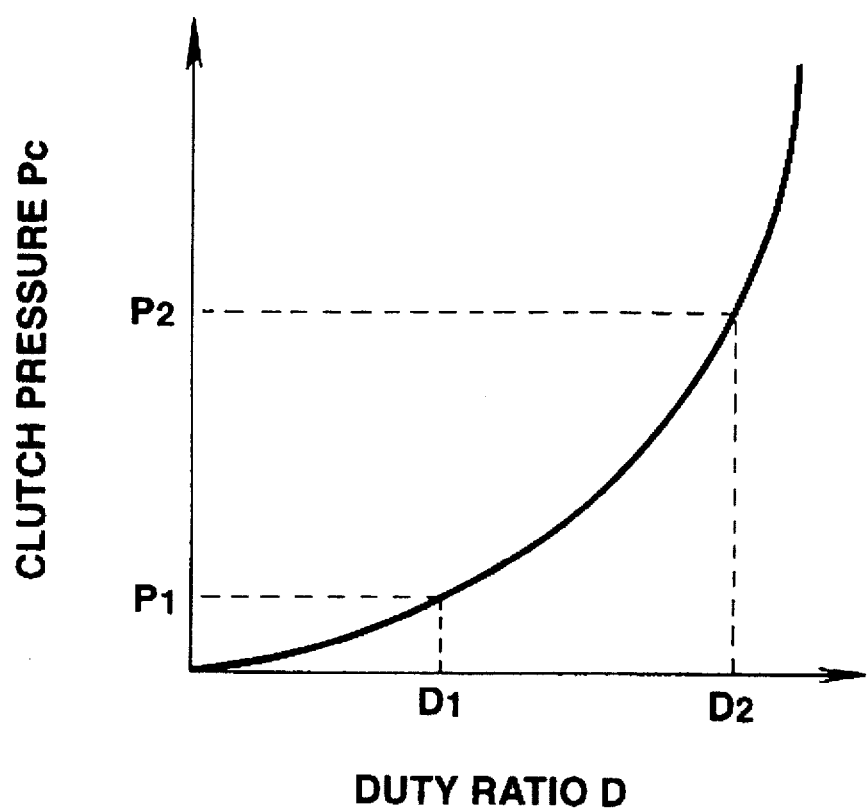
FIG. 12 is a graph showing a duty cycle control response in relation to clutch pressure variation.
Figure 13:
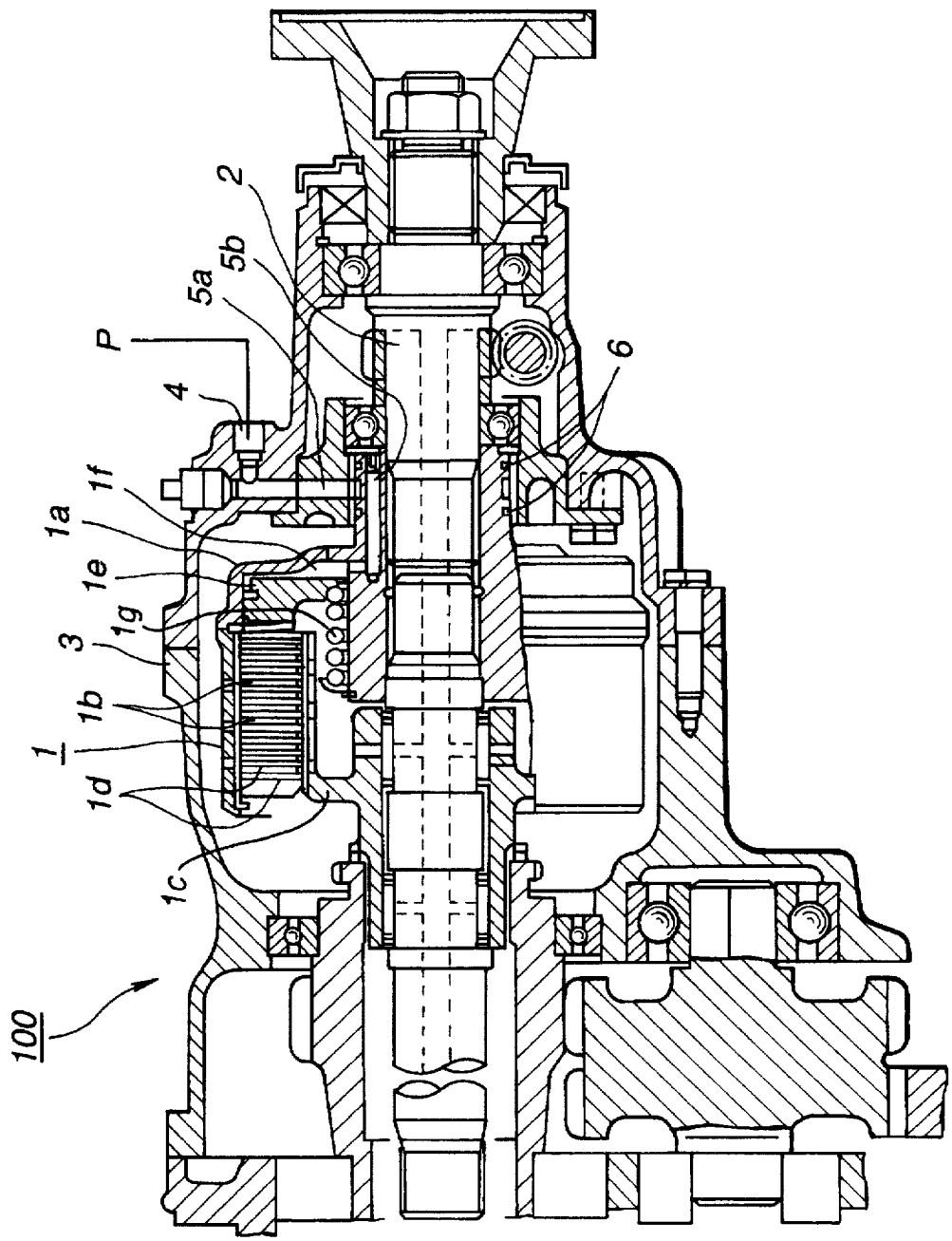
FIG. 13 is a cross-sectional view of a conventional transfer unit for effecting variable driving force distribution, as utilized in a 4WD vehicle.

According to this structure, set data and processing of memory data can be utilized at the same time. Referring to FIGS. 10–12, FIG. 10 is a graph showing data on a relation between front and rear wheel rotational speed difference and front wheel torque transmission. Further, the graph of FIG. 11 represents data related to control response of working fluid pressure in the clutch in relation to front wheel torque transmission, while FIG. 12 shows duty cycle control response in relation to clutch pressure variation.

At this, the frictional clutch 66 may be made responsive to a set torque distribution ratio in a range (rear wheels: front wheels) of between 100%: 0 to 50%: 50% in variation.

Also, the sub-transmission lever maybe used for selection of a 2WD Hi range, a 4WD high speed range, a mid or N range, a 4WD low speed range. The 2–4 WD sensor 90 outputs the mode signal Dn upon operation of the select lever.

When the N range is selected, the shift sleeve 64b (FIG. 3) is moved to the N position. At this, the shift sleeve 64b, the high speed shift gear 64c, low speed shift gear 64d, and the driving gear 80 are mutually engaged for establishing driven operation of all four vehicle wheels.

On the other hand, when the 2H gear range is selected, the 2–4WD mode sensor 90 outputs 2WD mode signal Dn to the controller. According to this, fluid pressure control to the input port 74 of the transfer 22 of the clutch line pressure Pc is discontinued, and two wheel drive operation is established.

According to the above described structure, leaking of a seal portion according to long term operation is prevented effectively in comparison with the prior art, and highly accurate control the clutch pressure Pc supplied to the cylinder casing may be achieved to assure accurate and responsive torque distribution.

Thus, according to the invention as set forth above, a multi-plate type friction clutch is provided in which highly accurate control of driving force distribution can always be reliably maintained. Further, according to the invention, variable control of a torque distribution ratio and reliable maintaining of fluid pressure in a fluid circuit may be obtained from a single controller.

It will be appreciated that a multi-plate type frictional clutch structure may be embodied in various ways without departing from the scope of the present invention or the underlying inventive concept thereof.

What is claimed is:

1. A multi-plate type frictional clutch structure comprising:

a casing having an interior wall portion;

a multi-plate clutch assembly within said casing; and a clutch piston mounted on said interior wall portion for movement along a predetermined axis toward said multi-plate clutch assembly to engage said multi-plate clutch assembly and for return movement along said predetermined axis away from said multi-plate clutch assembly to disengage said multi-plate clutch assembly;

said clutch piston and said casing cooperating with each other to define between said clutch piston and said interior wall of said casing a cylinder chamber;

said clutch piston and said interior wall portion engaging each other to define a rotation restriction portion operative to normally restrict a rotational movement of said clutch piston about said predetermined axis, said rotation restriction portion being operative to allow rotational movement of said clutch piston about said predetermined axis when said clutch piston is subject to a torque greater than a predetermined torque value.

2. A multi-type frictional clutch as set forth in claim 1, wherein said rotation restriction portion has a restriction strength lower than a minimum engagement strength of said multi-type clutch assembly.

3. A multi-plate type frictional clutch as set forth in claim 2, wherein said rotation restriction portion comprises piston bosses integral with said clutch piston and casing bosses integral with said interior wall of said casing, said piston bosses and said casing bosses being engaged to restrict rotational movement of said clutch piston about said predetermined axis until said clutch piston is subject to torque greater than said predetermined torque value.

4. A multi-plate type frictional clutch as set forth in claim 3, wherein said piston bosses have less restriction strength than said casing bosses to permit rotational movement of said clutch piston about said predetermined axis when said clutch piston is subject to torque greater than said predetermined torque value.

* * * * *